United States Patent Office 2,773,745
Patented Dec. 11, 1956

2,773,745

PROCESS FOR THE PRODUCTION OF PURE SILICON IN A COARSE CRYSTALLINE FORM

Keith Huestis Butler, Marblehead, Mass., and Carl Marcus Olson, Newark, Del., assignors to E. I. du Pont de Nemours & Company, Wilmington, Del., a corporation of Delaware No Drawing. Application July 20, 1954,
Serial No. 444,655

10 Claims. (Cl. 23—223.5)

This invention relates to the production of silicon in extremely pure, elementary state, and more particularly to the preparation of such pure element by reduction of its volatile halides.

More specifically, the invention pertains to the production of pure silicon and to novel methods for obtaining the same. Such element has a melting point above the boiling point of the metallic reducing agent used in its preparation, said methods comprising the vapor phase reaction under controlled conditions of a relatively pure divalent metallic reducing agent, e. g., zinc, with a relatively pure volatile tetrahalide of silicon, e. g., silicon tetrachloride.

It is customary in ordinary metallurgy to obtain metals from their oxides by reduction and to employ such reducing agents as carbon, carbon monoxide, hydrogen, etc., in effecting said reduction. Some oxides cannot be easily reduced in this manner, the oxide of silicon being an outstanding example. While silicon oxide is widely distributed in nature and silicon is obtainable in its elementary condition by reduction with coal or coke in an electric furnace, the resulting product recovered is not sufficiently pure for certain important electrical uses, since it contains, in addition to silicon carbide, impurities present in the quartz or sand used in its preparation along with impurities present in the carbonaceous reagent. In such state of inadequate purity it is not satisfactory for use in adaptations involving rectification and amplification of electric current. In such instances, the degree of purity is such that ordinary spectrographic chemical or colorimetric analytical methods are of limited value in evaluation of the product. Generally, it is necessary to rely on electrical tests to ascertain if the degree of purity is satisfactory for the applications in question. An extremely pure state is therefore essential to a silicon product useful for important, special electrical employments, especially wherein low electrical conductivity values are a prerequisite.

Other methods exist for obtaining elementary substances by reduction of their compounds, but these too have been found to be useless for producing the element in the state of purity mentioned which is essential before it can be utilized in the applications referred to. For example, it has been proposed to obtain silicon by feeding silicon tetrachloride into a chamber containing molten aluminum and to recover by tapping off the silicon due to the greater affinity of the chlorine for the aluminum. This method is disadvantageous because a subsequent washing treatment of the reduced element is required to remove reaction by-products, and furthermore the conditions prevailinng during the reduction are such that a partial oxidation of the element occurs. Another method, proposed for the production of amphoteric elements other than silicon, consists in conducting a stream of a vaporized reducing agent and a stream of the halide to be reduced into a reduction chamber where the mixed vaporous reactants come into contact with an incandescent filament heating element. It is claimed that this method will produce deposits of zirconium, titanium, uranium and beryllium in dense, tightly adherent form on the filament which may be a tungsten wire. Its separation from the filament material is a problem and must be carefully done, usually by cutting technique, if a pure product is to be recovered. The regulation of temperature of the filaments is important, as the metals listed above also conduct electricity and as the cross section of the wire grows, the resistance diminishes. If one attempts to make silicon by this hot wrie method, elementary silicon can be deposited on the filament but when the latter is raised to a temperature above about 1100° C., a silicide of tungsten forms and the product will comprise layers of tungsten, tungsten silicide and silicon with boundaries being uncertain as the reaction between the two elements goes to completion or when the whole of the tungsten has reacted to form the desired product. The silicon crystals become appreciably conductive at red heat and above and, as for the metals, the resistance of the electrical system varies with the extent of the reaction. Deposits of the desired thickness are impractical. In consequence, the product from this process is contaminated with undesired amounts of tungsten or other metal constituting the filament used as the heating element.

It is among the objects of this invention to overcome the foregoing and other disadvantages characterizing prior silicon production and to provide a novel method for obtaining this element in pure, contaminant-free condition without the attendant disadvantages of prior methods. A particular object of the invention is to obtain such pure elemenary substance through interaction of a relatively pure metal reactant reducing agent with a relatively pure silicon compound. A further object is to obtain a pure elementary substance forming difficultly reducible oxides, especially silicon, from its volatile halides, especially the chloride or bromide thereof. A special object of the invention is to produce elementary silicon from pure silicon tetrachloride by growing well-defined crystals thereof from the vapor phase reaction of said chloride with pure, votalilized zinc as a reducing agent, with attendant elimination of undesired impurities which result from the crystallization process. It is a further object to prepare this crystallized silicon in the form of a loosely coherent deposit easily recoverable from the reactor in uncontaminated form. A special object of this invention is to produce such pure elementary crystalline silicon from silicon tetrachloride by reaction with volatilized zinc. Other objects and advantages of the invention will be apparent from the ensuing description thereof.

These and other objects are attainable in this invention which comprises obtaining a pure crystalline silicon by separately vaporizing high-purity zinc or cadmium as a metallic reducing agent and a silicon halide of high purity, and reacting the resulting products in a reaction zone in the vapor phase, said reaction zone being preferably maintained at a temperature above the dew point of the reactants and salt by-product, and recovering the pure silicon element.

In a more specific embodiment, the invention comprises separately vaporizing and then uniting in substantially stoichiometric proportions for vapor phase reaction in a separate reaction zone a purified divalent metallic reducing agent, preferably zinc, and a purified halide, preferably a chloride, of silicon, externally heating said reaction zone to maintain the same at a temperature above the condensation temperature of either reactant and the salt by-product, removing the volatilized reaction by-products from said zone and recovering the pure, condensed silicon which forms therein.

The process is relatively simple and characterized by the reduction of a tetrahalide of silicone, e. g., silicon tetrachloride by a divalent reducing metal, e. g., zinc. Cadmium is considered an equivalent of zinc but is less attractive commercially at the present time due to its lesser availability and higher price. Silicon tetrabromide may be substituted for silicon tetrachloride but, likewise, it is not now commercially attractive. The operation is carried out at a temperature above the condensation temperature of either reactant and also the salt by-product, but not in excess of 1100° C. The walls of the reaction chamber are usually maintained at a temperature of between 925° C. and 1100° C. in large-scale operation conditions.

In description of one preferred method of isolating a difficultly reducible element in accordance with the invention, involving the vapor phase reduction of silicon tetrachloride with volatilized zinc as the reducing agent, a suitable quantity of purified zinc metal (99.99%) of commerce is conveniently introduced into a non-reactive, preferably silica-type of closed vessel or receptacle adapted to be externally heated by either electrical or gas firing means to a temperature above the boiling point of the zinc (907° C.). In an associated, similar type vessel, also adapted to be externally heated to a temperature above the volatilization temperature of its contents, a suitable quantity of relatively pure silicon tetrachloride (or bromide) is placed. Each vessel is equipped with suitable conduits in direct communication with a separate reaction chamber constructed wholly of silica, through which products volatilized therein upon application of sufficient heat thereto pass for concurrent introduction into, but at controlled rates and in substantially stoichiometric proportions, for vapor phase reaction. The silica walls of the reaction chamber are maintained at any desired temperature, suitable for promoting the vapor phase reaction of the volatized zinc and silicon tetrachloride, either by the contained heat of the vaporous materials introduced therein, or by the heat generated during their reaction, or by virtue of suitable, associated external heating equipment (either electrical or gas-fired type, whichever is preferred). In general, we have found it advantageous to so regulate the reaction zone conditions that temperatures not in excess of about 1100° C., and preferably from about 950° C. to not to exceed 1000° C., prevail therein. Upon introduction of the vaporized materials into the reaction vessel, pure silicon, as loosely cohered, acicular crystalline aggregates, is formed in the reaction zone and projected from the walls thereof. The resulting vapors, after completion of the reaction, which contain zinc chloride and any unconsumed reactants, are discharged from the reaction vessel through a suitable discharge outlet into conventional condensing equipment, and decomposition by electrolysis of the zinc chloride may be subsequently effected to recover the zinc metal and chlorine for reuse in the process. As a result, a cyclic type of operation is provided.

The silicon product recovered from the reaction zone will consist of a 99.98+ purity type of material, wholly free from objectionable amounts of deleterious impurities, and, at most, will contain but spectrographic traces of impurities. Thus, when samples of the product are tested by extremely sensitive spectrographic means, they will be found to consist of substantially the following composition or analysis:

| | Percent |
|---|---|
| Si | [1] 99.98 |
| Zn | 0–.005 |
| Al | 0–.005 |
| Mg | 0–.002 |
| Cu | 0–.004 |
| Fe | 0–.002 |

Other elements not detected.

[1] Minimum.

Actually the spectroscopic analysis has but small utility in characterization of the product. The high state of purity and substantially complete freedom from contaminants possessed by our novel silicon product will be evident upon subjecting it to comparative conductivity tests with a purified prior art 98% silicon material. The following table illustrates these comparative conductivity values:

Reciprocal ohm-centimeters
(a) Acicular product_____ About 0.01.
(b) Acicular product melted to ingot 0.1 to 1.0 and not form. greater than 5.
(c) Prior art product melted to ingot 15 to 30. form.

(The foregoing conductivity determinations were made in accordance with the methods described by Stephen James Angello in The Physical Review, pages 371–377, vol. 62, second series, Nos. 7 and 8, October 1 and 15, 1942, published by The American Institute of Physics, Inc., New York.)

It is believed that the very low conductivity of the silicon product from our process results from crystal growth at comparatively low temperature in the vapor phase. It is believed that the growth of crystals to yield the acicular product characteristic of this process serves to reject impurities present in the reactants. A small percentage of finely divided silicon forms in the process and appears mixed with the crystals. These fines are of inferior quality to the crystals and are preferably separated after recovery of a given batch by mechanical means. This separation may be effected by sieving the product by passage over a screen of desired opening size, e. g., a 10–60 mesh plastic screen, which allows the fines to pass through, and this fraction may be used in competition with the prior art silicon of commerce. The coarse acicular product retained on the screen is silicon of high purity and has a conductivity of about 0.01 reciprocal ohm-centimeter or less. The comparatively low operating temperature which is possible in our process avoids contamination due to attack of the materials of construction by the corrosive halides and by zinc.

To a more complete understanding of the invention, the following specific examples thereof are given, which are not to be construed as in any wise limiting the underlying principle and scope of our invention:

*Example I*

99.99% zinc metal of commerce was placed in a silica vessel provided with gas-fired heating means for raising the zinc above its boiling point (907° C.). Redistilled silicon tetrachloride was placed in a separate but similar container also equipped with means for heating the tetrachloride above its boiling point. These vessels were connected by means of suitable ducts with a separate reaction chamber adapted to be maintained at a temperature of 950° C. Heat was then applied to the two vessels, the rate of heating being so adjusted that vapors generated in each were separately introduced in substantially stoichiometric proportions for vapor phase reaction in said reaction chamber. The latter chamber was provided with a discharge outlet or duct, through which zinc chloride vapor formed as a reaction product in said chamber was continuously withdrawn for discharge into a conventional cooling chamber, wherein the same was condensed, the zinc component thereof being recovered for reuse in the process by electrolysis decomposition. After three hours' operation the reaction was discontinued and a very pure (99.9+%) silicon product was recovered from said chamber.

*Example II*

Silicon tetrachloride vapor was preheated to a temperature of about 900° C. and admitted to a reaction chamber similar to that described in Example I. Zinc vapor was likewise admitted into this reaction chamber, the latter being maintained at a temperature slightly in excess of 1000° C. Such rates of addition of the two reactants were maintained that the zinc would be 10% in excess, as a result of which the exit gases from the reaction chamber contained both zinc and zinc chloride. After 5 hours' operation the chamber was opened and the product was found to be large transparent yellow plates of substantially pure (99.9+%) silicon.

*Example III*

An apparatus of design similar to that mentioned in Examples I and II, and constructed of silica chambers and piping, was used with zinc vapor being generated in one container and silicon chloride vapor in the other. Prior to the start of the operation, nitrogen was admitted to the system so as to sweep out any reactive gases such as water vapor or oxygen. The reactants were then admitted to the nitrogen-filled reaction chamber and the operation of the system continued as in Example I, using substantially equivalent amounts of the zinc and silicon chloride. Upon opening the reaction chamber at the end of the operation, a very pure (99.9+%) silicon deposit was found, having an acicular structure, and having a conductivity value of about 0.01 reciprocal ohm-centimeter, and was removable as a granular product.

*Example IV*

Example I was repeated, but at the end of the operation silicon chloride was passed by recycling through the reaction chamber for a short period of time to remove any zinc which was adsorbed on the silicon product. This operation also insured the removal of all zinc chloride from the product.

*Example V*

Silicon tetrachloride vapor was generated in a silica flask and the vapors passed through a preheater interposed in the silica conduit leading to the reaction chamber. A similar silica flask was used to generate zinc vapor, the latter flask also being provided with a silica connection leading to the reaction chamber. The silicon tetrachloride generator was maintained at a temperature slightly below the boiling point of the chloride and vaporization thereof effected by bubbling dry nitrogen gas therethrough, to obtain a gaseous mixture of nitrogen and silicon tetrachloride. The preheater raised the temperature thereof to about 900° C. Upon admission of the vaporous silicon tetrachloride into the reaction chamber with the vaporized zinc, pure silicon was formed by reduction of the former, leaving gaseous zinc chloride in admixture with nitrogen. The zinc chloride was condensed as in Example I and the nitrogen became available for reuse in the process.

*Example VI*

99.999% zinc metal of commerce was placed in a silica vessel provided with heating means for raising the temperature of the zinc above its boiling point, and with feeding means for replenishing the supply of zinc over an extended period of operation without interruption. Redistilled silicon tetrachloride was placed in a similar, but separate, container, also equipped with heating means for vaporizing the silicon tetrachloride, and with feeding means for replenishing the supply. These vessels were connected by means of suitable fused silica tubular ducts, with a separate reaction chamber adapted to be maintained at a temperature above the boiling point of zinc. These ducts are positioned in separate furnaces adapted to bring the gaseous reactants entering the reaction chamber to a temperature close to the reaction temperature of about 950° C. The reaction chamber comprised a silica tube about 8 inches in diameter and about 6 feet in length and surrounded with heating means adapted to control reactor wall temperature during reaction. The end through which the reactant gases entered was closed except for the openings of said ducts supplying preheated reactant gases. The entering gas streams were parallel to each other and to the axis of the cylindrical reactor. The discharge end of the reactor was closed by a ground joint friction tight plate, with a 2-inch diameter opening for exiting by-product gases. The reaction startup was accomplished by first sweeping the reactor out with dry argon while heating the reactor system to the desired temperature and while zinc vaporization was started. Upon stabilization of zinc vaporization through the reactor system, the flow of argon was stopped and the vaporization of silicon tetrachloride through the preheater and reactor was started. Thus, silicon tetrachloride and zinc vapor at about 950° C. were simultaneously passed into the reactor being maintained at about 950° C. for reaction therein. The simultaneous addition of reactants was uniformly maintained over a period of about 40 hours, during which period 15½ pounds of silicon were deposited in the reactor in the form of loosely coherent acicular crystals. The silicon tetrachloride was passed through the reactor for an hour after the discontinuance of the zinc vaporization and then the reactor was cooled, using a flow of dry argon to prevent air from entering the reactor during cooling. During this period 285 pounds of silicon tetrachloride and 147 pounds of zinc were vaporized and passed into the reactor. The product silicon was removed from the reactor by means of a hoe fabricated of zinc plated iron, screened through a 15 x 18 mesh to the inch plastic screen, and washed with distilled water. The coarse material which did not pass through the screen was of very low electrical conductivity and was suitable for most exacting semi-conductor uses.

*Example VII*

Using the cylindrical reactor system and reactants described in Example VI, with the addition of a 6″ diameter circular plate type baffle made of silica installed in the reaction chamber approximately one foot from the entrance end, and perpendicular to the axis of the reactor, the silicon tetrachloride and zinc vapor entering the reactor were heated to 915–925° C. before entering the reactor, which was maintained at 940–955° C. The simultaneous addition of reactants was uniformly maintained over a period of about 38 hours, during which period 18½ pounds of silicon were deposited within the reaction chamber, largely downstream of the baffle, and in the form of loosely coherent acicular crystals. The flow of silicon tetrachloride vapor was continued for a half hour after the cessation of zinc vapor flow and before cooling. During this period 244 pounds of silicon tetrachloride and 168 pounds of zinc were vaporized and passed through the pre-heater into the reactor. The product silicon was removed from the reactor, screened through a 14 mesh to the inch plastic screen, and washed with distilled water. The coarse material retained on the screen was very low in electrical conductivity and was suitable for the most exacting semi-conductor uses.

As noted, our invention comprises the production of pure silicon in the form of loosely coherent crystalline aggregates which are easily removed from the reactor walls without contamination by the materials of construction or damage thereto. After mechanical separation of fines, these crystals are ready for melting into ingots suitable for the various electrical employments for which this material is eminently suitable.

Zinc comprises a preferred type of reducing reactant owing to its general availability and ease of purification. It is possible also to use cadmium. However, other materials, such as sodium, magnesium, calcium, and the like, are not satisfactory for production of a crystalline silicon, free of by-products and impurities such as this invention affords. As noted, silicon chloride is the preferred halide, although silicon bromide can be used.

As indicated in the examples, diluting or carrier gases, such as nitrogen, helium, or other inert gas, may be admitted into the reaction chamber along with the reactants. We find it possible to operate without carrier gas during the main part of the reaction and indeed we prefer to introduce only the vapors of the reducing metal and silicon halide into the reactor during the process. By so operating we avoid the possibility of introducing impurities with the diluent as and obtain a more economical operation.

As indicated above, our process is particularly suitable for producing pure silicon and is far superior to any heretofore known. The exceptional quality and purity of our product is evident from the fact that prior art silicon of so-called pure grade shows about one thousand times higher electrical conductivity than our product. The amount of impurities present in silicon greatly influences its conductivity properties, and by our process one can obtain a product in which iron or other undesired impurities are substantially completely absent. In addition to iron, the presence of boron, aluminum, manganese, and cobalt in the silicon as impurity is considered deleterious. To avoid iron contamination, the reaction is preferably carried out by bringing the purified reagents together in silica equipment which is not subject to attack at the temperatures employed. As a result, the product will be substantially free of this injurious impurity, whereas the prior art electric furnace product may contain as high as 2% iron, and after the most careful leaching with acids, including hydrofluoric acid, will contain about .01% iron. Hence, the electrical resistance of our silicon product will, due to its pure state, be far different from that of prior art materials, and its use is readily permitted in those special applications where prior materials are unfit.

We normally prefer to use approximately stoichiometric equivalents of zinc and silicon chloride; however, this is by no means necessary for realization of the advantages of our process. It is possible to operate with either a large excess of silicon chloride or a large excess of zinc. In either case, crystalline silicon of good quality will be realized. Generally, the best quality is realized by use of an excess of the halide. However, if the reactants used are sufficiently pure, it is possible also to produce acceptable material by use of excess zinc. In the event that large excess of one or the other reactants is used, the yield on the reactant in excess will, of course, be correspondingly lowered.

The silicon prepared by our process is eminently suited to a wide variety of uses in the electrical industry. Indeed, the high purity of the silicon attained by our process is so unique that the development of the silicon junction transistor and large area power rectifiers would not have been possible without it.

These devices are made possible by capitalizing upon the mode of conduction of electricity by electrical charges in semi-conductors of which silicon is the preferred material. In these solids, negative electrons and positively charged electron vacancies (holes) can co-exist in numbers exceeding thermal equilibrium for a finite (1 to 1,000 microseconds) time interval. The average existence of a given entity is called the "lifetime." These charges are free to move about in the solid and will travel in the appropriate direction if an electrical potential is applied across the solid. However, these excess negative electrons and positive holes will recombine provided there is available a mechanism for the dissipation of the energy of recombination. Crystal imperfections and chemical impurities provide locations in the solid where this energy can be dissipated. In the absence of such "recombination centers" the energy of recombination appears as radiant energy. However, the rate of such radiation process is small; therefore, catalyzed recombination usually predominates. It is known that by growing single crystals of silicon the electrical industry reduces the number of crystal imperfections to a point where chemical impurities are the predominantly limiting factor in "lifetime." The growing of a single crystal is described by Teal and Buehler, Physical Review, vol. 87, page 190, 1952. Methods for measuring "lifetime" have not yet been universally adopted. However, that described by Haynes and Hornbeck in Physical Review, vol. 90, page 152, 1953, has been used for the determination of the values herein cited.

In order to appreciate the extreme purity requirements for work in this branch of physics, it is necessary to redefine what is meant by the word "pure." Up to this time it has been accepted practice for chemists to assume a substance to be pure if the extraneous elements are in the range of a hundredth or a thousandth of a percent. At times, for particularly critical cases (e. g., drinking water or white pigments), impurities are measured in parts per million. To the physicist, however, one part per million represents $10^{16}$ impurity atoms per cubic centimeter of silicon. For critical applications, where "lifetime" of electron-hole pairs must be in the 100 microsecond range, it is necessary that the recombination centers not exceed, say, $10^{14}$ or $10^{13}$. This immediately means that the chemist must speak of impurities in terms of parts per billion.

Silicon is useful in the electrical industry for three major uses, viz., (1) point contact rectifiers (diodes) for high frequency work, e. g., radar, television, (2) transistors, and (3) power rectifiers. Purity requirements for these three divisions increases in the order shown. It is possible, by repeated acid extractions of 99+% silicon, followed by recrystallization (as described in U. S. Patent 2,402,582) from the melt, to obtain a silicon from which diodes can be made. However, the non-uniform results obtained from silicon derived in this way led most radar component manufacturers during World War II to use the silicon prepared by our invention. Point contact diodes are the least critical devices since the value for "lifetime" can be a fraction of a microsecond.

For the manufacture of transistors and rectifiers, it is necessary in practice for the silicon to have inherent high "lifetime" properties. While the "lifetime" of the silicon in the actual transistor or rectifier may be less than 15 microseconds, it is necessary to have higher inherent "lifetime" in the silicon raw material from which these transistors and rectifiers are made in order to allow for loss of "lifetime" due to controlled addition of modifying agents and changes occurring during fabrication. Accordingly, the highest attainable "lifetime" in the silicon prior to fabrication of these electronic devices is preferred. We have produced silicon having "lifetime" values in the range of from 15 to 200 microseconds by the modes of operation as outlined in Examples III and IV. Such products are highly suitable for such applications. It is becoming increasingly evident that the transistor and broad area power rectifier will make an even greater impact upon our technological progress in the year ahead.

The particular choice of reactants, materials of construction, and the method of carrying out our invention makes it possible to achieve a product of purity, resistivity, and "lifetime" heretofore unattainable. While it is true that not every element in the periodic table is equally deleterious to "lifetime," our invention permits the production of silicon uncontaminated by the most pernicious elements. As a result, "lifetime" in excess of 15 microseconds has been obtained for the silicon product of our invention.

This application is a continuation-in-part of our copending application Ser. No. 650,746, filed February 27, 1946, now abandoned, which, in turn, is a continuation-in-part of our application Ser. No. 507,910, filed October 27, 1943, which is now abandoned.

We claim as our invention:

1. A process for the production of pure 99.98+% silicon in a coarse crystalline and loosely coherent form which comprises mixing a separately heated, vaporous stream of a reducing metal selected from the group consisting of zinc and cadmium at substantial reaction temperature with a vaporous separately heated stream of a tetrahalide of silicon selected from the group consisting of a chloride and bromide, also at a reaction temperature within a silica reaction chamber, the walls of which are maintained at a temperature above the dew point of the reducing metal and of the dihalide salt by-product of said reducing metal formed in the process but not in excess of a temperature of 1100° C., and recovering the pure crystalline silicon product which results.

2. A process for the production of pure 99.98+% silicon in a coarse crystalline and loosely coherent form which comprises mixing a separately heated, vaporous stream of zinc at substantial reaction temperature with a vaporous separately heated stream of silicon tetrachloride also at a reaction temperature within a silica reaction chamber, the walls of which are maintained at a temperature above the dew point of zinc and of zinc chloride formed in the process but not in excess of 1100° C., simultaneously withdrawing the vaporous by-product salt along with any unconsumed reactant material from said chamber and recovering the crystalline silicon product formed and deposited therein.

3. A process for the production of pure 99.98+% silicon in a coarse crystalline and loosely coherent form which comprises mixing a separately heated, vaporous stream of cadmium at substantial reaction temperature with a vaporous separately heated stream of silicon tetrachloride also at a reaction temperature within a silica reaction chamber, the walls of which are maintained at a temperature above the dew point of cadmium and of cadmium chloride but not in excess of 1100° C., simultaneously withdrawing the vaporous by-product salt along with any unconsumed reactant material from said chamber and recovering the crystalline silicon product formed and deposited therein.

4. A process for the production of pure 99.98+% silicon in a coarse crystalline and loosely coherent form which comprises mixing a separately heated, vaporous stream of zinc at substantial reaction temperature with a vaporous separately heated stream of silicon tetrachloride also at a reaction temperature within a silica reaction chamber, the walls of which are externally heated and maintained at a temperature above the boiling point of zinc, but not in excess of 1100° C., simultaneously withdrawing from said chamber the vaporous by-product salt formed along with any unconsumed reactant material and recovering the crystalline silicon product from the said reaction chamber.

5. A process for the production of pure 99.98+% silicon in a coarse crystalline and loosely coherent form which comprises mixing a separately heated, vaporous stream of zinc at substantial reaction temperature with a vaporous separately heated stream of silicon tetrachloride also at a reaction temperature within a silica reaction chamber, the walls of which are externally heated and maintained at a temperature of between 925° C. and 1100° C., simultaneously withdrawing from said chamber the vaporous by-product salt formed along with any unconsumed reactant material and recovering the crystalline silicon product from the said reaction chamber.

6. A process for the production of pure 99.98+% silicon in a coarse crystalline and loosely coherent form which comprises mixing a separately heated, vaporous stream of cadmium at substantial reaction temperature with a vaporous separately heated stream of silicon tetrachloride also at a reaction temperature within a silica reaction chamber, the walls of which are externally heated and maintained at a temperature of between about 960° C. and 1100° C., simultaneously withdrawing from said chamber the vaporous by-product salt formed along with any unconsumed reactant material and recovering the crystalline silicon product from the said reaction chamber.

7. A process for the production of pure 99.98+% silicon in a coarse crystalline and loosely coherent form which comprises mixing a separately heated, vaporous stream of zinc at substantial reaction temperature with a vaporous separately heated stream of silicon tetrachloride also at a reaction temperature within a silica reaction chamber, the walls of which are externally heated and maintained at a temperature of between 950° C. and 1000° C., simultaneously withdrawing from said chamber the vaporous by-product salt formed along with any unconsumed reactant material and recovering the crystalline silicon product from the said reaction chamber.

8. A process for the production of pure 99.98+% silicon in a coarse crystalline and loosely coherent form which comprises mixing a separately heated, vaporous stream of cadmium at substantial reaction temperature with a vaporous separately heated stream of silicon tetrachloride also at a reaction temperature within a silica reaction chamber, the walls of which are externally heated and maintained at a temperature of between 975° C. and 1025° C., simultaneously withdrawing from said chamber the vaporous by-product salt formed along with any unconsumed reactant material and recovering the crystalline silicon product from the said reaction chamber.

9. A process for the production of pure 99.98+% silicon in a coarse crystalline and loosely coherent form which comprises generating separately and simultaneously vaporous streams at substantially reaction temperature of zinc of high purity and silicon tetrachloride of high purity in silica equipment, combining said streams at said temperature within a silica reaction chamber, the walls of which are externally heated and maintained at a temperature above the boiling point of zinc but not in excess of 1100° C., maintaining the two reactants and the reaction products out of contact with structural materials other than silica during the generation of the vapors, passage to the silica reaction chamber and while retained therein, withdrawing from said chamber the vaporous by-product salt along with any unconsumed reactant material and recovering the crystalline silicon product from the said reaction chamber.

10. A process for the production of pure 99.98+% silicon in a coarse crystalline and loosely coherent form which comprises generating separately and simultaneously vaporous streams at substantially reaction temperature of zinc of high purity and silicon tetrachloride of high purity in silica equipment, combining said streams at said temperature within a silica reaction chamber, the walls of which are externally heated and maintained at a temperature above the boiling point of zinc but not in excess of 1100° C., maintaining the two reactants and the reaction products out of contact with structural materials other than silica during the generation of the vapors, passage to the silica reaction chamber and while retained therein, withdrawing from said chamber the vaporous by-product salt along with any unconsumed reactant material, removing the loosely coherent crystalline silicon product from the reaction chamber and mechanically separating the coarser acicular silicon product of high resistivity from the finer non-acicular silicon, thereby obtaining the silicon product of superior electrical properties.

References Cited in the file of this patent

UNITED STATES PATENTS

| | | |
|---|---|---|
| 1,061,256 | Allen et al. | May 13, 1913 |
| 1,241,796 | Weaver | Oct. 2, 1917 |
| 1,306,568 | Weintraub | June 10, 1919 |
| 1,386,227 | Becket | Aug. 2, 1921 |
| 2,402,582 | Scaff | June 25, 1946 |

FOREIGN PATENTS

| | | |
|---|---|---|
| 435,754 | Great Britain | Sept. 23, 1935 |

OTHER REFERENCES

Mellor: "Comprehensive Treatise on Inorganic and Theoretical Chemistry," vol. 6, 1925, page 157, Longmans, Green and Company, N. Y. C.